(12) United States Patent
Voegler et al.

(10) Patent No.: US 10,189,207 B2
(45) Date of Patent: Jan. 29, 2019

(54) SONOTRODE

(71) Applicant: TETRA LAVAL HOLDINGS & FINANCE S.A., Pully (CH)

(72) Inventors: Ulrich Voegler, Uhldingen (DE); Sergio Mancin, Modena (IT); Antonio Melandri, Rubiera (IT); Javier Herzog-Gisbert, Montale Rangone (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 514 days.

(21) Appl. No.: 14/768,808

(22) PCT Filed: Feb. 21, 2014

(86) PCT No.: PCT/EP2014/053381
§ 371 (c)(1),
(2) Date: Aug. 19, 2015

(87) PCT Pub. No.: WO2014/135381
PCT Pub. Date: Sep. 12, 2014

(65) Prior Publication Data
US 2016/0001498 A1    Jan. 7, 2016

(30) Foreign Application Priority Data

Mar. 7, 2013 (EP) .................................... 13158237

(51) Int. Cl.
*B32B 37/00* (2006.01)
*B29C 65/08* (2006.01)
(Continued)

(52) U.S. Cl.
CPC ............... *B29C 65/08* (2013.01); *B06B 3/00* (2013.01); *B29C 65/7451* (2013.01);
(Continued)

(58) Field of Classification Search
CPC . B29C 65/08; B29C 65/7451; B29C 66/1122; B29C 66/4312; B29C 66/81431;
(Continued)

(56) References Cited

U.S. PATENT DOCUMENTS 3,939,033 A * 2/1976 Grgach ...................... B06B 3/00
156/515
4,315,181 A    2/1982 Holze, Jr.
(Continued)

FOREIGN PATENT DOCUMENTS

CN   102802920 A   11/2012
DE   1 427 329 A1   1/1969
(Continued)

OTHER PUBLICATIONS

International Search Report (PCT/ISA/210) dated May 20, 2014, by the European Patent Office as the International Searching Authority for International Application No. PCT/EP2014/053381 (4 Pgs).

*Primary Examiner* — James D Sells
(74) *Attorney, Agent, or Firm* — Buchanan Ingersoll & Rooney PC (57) ABSTRACT

There is disclosed a sonotrode comprising: a head which defines a sealing surface elongated along a first direction orthogonal to a second direction and at least one first slot which extends through the head transversally to the first direction; the first slot extends parallel to a third direction inclined to both the first direction and the second direction; the first direction defines an acute angle with the second direction.

16 Claims, 7 Drawing Sheets

(51) Int. Cl.
*B06B 3/00* (2006.01)
*B29C 65/74* (2006.01)
*B29C 65/00* (2006.01)
*B65B 51/22* (2006.01)
*B65B 9/10* (2006.01)
*B29L 31/00* (2006.01)
*B29K 705/02* (2006.01)

(52) U.S. Cl.
CPC ...... *B29C 66/1122* (2013.01); *B29C 66/4312* (2013.01); *B29C 66/8145* (2013.01); *B29C 66/8167* (2013.01); *B29C 66/81431* (2013.01); *B29C 66/849* (2013.01); *B29C 66/9512* (2013.01); *B29C 66/9516* (2013.01); *B65B 9/10* (2013.01); *B65B 51/225* (2013.01); *B06B 2201/72* (2013.01); *B29C 66/71* (2013.01); *B29C 66/72321* (2013.01); *B29C 66/72328* (2013.01); *B29C 66/72341* (2013.01); *B29C 66/73921* (2013.01); *B29C 66/8322* (2013.01); *B29K 2705/02* (2013.01); *B29L 2031/7166* (2013.01)

(58) Field of Classification Search
CPC ............ B29C 66/8145; B29C 66/8167; B29C 66/849; B29C 66/9512; B29C 66/9516; B65B 9/10; B65B 51/225

USPC ...................................................... 156/580.1
See application file for complete search history.

(56) References Cited

U.S. PATENT DOCUMENTS

| | | | |
|---|---|---|---|
| 4,363,992 A * | 12/1982 | Holze, Jr. | B06B 3/00 |
| | | | 310/323.19 |
| 5,730,351 A | 3/1998 | Hermann | |
| 2004/0013449 A1 | 1/2004 | Fujimoto et al. | |
| 2010/0139867 A1 | 6/2010 | Martin et al. | |
| 2012/0285128 A1* | 11/2012 | Kamigaito | B65B 51/26 |
| | | | 53/548 |
| 2013/0008132 A1 | 1/2013 | Vögler et al. | |

FOREIGN PATENT DOCUMENTS

| | | |
|---|---|---|
| EP | 0 711 626 A1 | 5/1996 |
| EP | 0 615 907 B1 | 10/1997 |
| JP | 6-881 A | 1/1994 |
| JP | 2002-210412 A | 7/2002 |
| WO | WO 2007/020208 A2 | 2/2007 |
| WO | WO 2011/117119 A1 | 9/2011 |

* cited by examiner

SONOTRODE

TECHNICAL FIELD

The present invention relates to a sonotrode, in particular to a sonotrode for transversally sealing a package with a volume of about 200 ml.

BACKGROUND OF INVENTION

Many pourable food products, such as fruit juice, pasteurized or UHT (ultra-high-temperature processed) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, such packages are made on fully automatic packaging machines, on which a continuous tube is formed from the web-fed packaging material; the web of packaging material is sterilized on the packaging machine itself, e.g. by applying a chemical sterilizing agent, such as a hydrogen peroxide solution, which, after sterilization, is removed, e.g. vaporized by heating, from the surfaces of the packaging material; and the web of packaging material so sterilized is maintained in a closed sterile environment, and is folded and sealed longitudinally to form a vertical tube.

The tube is filled from the top with the sterilized or sterile-processed food product, and is gripped at equally spaced cross sections by two pairs of jaws. More specifically, the pairs of jaws act cyclically and successively on the tube to seal the packaging material of the tube and form a continuous strip of pillow packs connected to one another by respective transversal sealing bands.

The pillow packs are separated by cutting the relative sealing bands, and are then conveyed to a final folding station where they are folded mechanically into the finished parallelepiped shape.

In a first alternative, the packaging machine comprises two forming assemblies movable along respective guides and which interact cyclically with the tube to heat seal the packaging material of the tube. Each forming assembly comprises a slide movable back and forth along respective guide; and the two jaws which are hinged at the bottom to the respective slide, and move between a closed position, in which they cooperate with the tube to seal it, and an open position in which they are detached from the tube.

In a second alternative, the packaging machine comprises two chain conveyors defining respective endless path and fitted with respective number of jaws. The two paths have respective branches substantially facing and parallel to each other, and between which the tube of packaging material is fed so that the jaws on one conveyor cooperate with the corresponding jaws on the other conveyor along branches of respective paths, to grip the tube at a number of successive cross sections, and to seal and cut the packs.

In the case of aseptic packages with an aluminium layer as the barrier material, the cross sections of the tube are normally sealed by induction of loss current in the aluminium layer to melt the heat-seal plastic material locally.

More specifically, one of the jaws in each pair comprises a main body made of nonconductive material, and an inductor housed in a face seat on the main body; while the other jaw has pressure pads made of flexible material, such as rubber.

The inductor is energized when the relative pair of jaws grips the tube, so as to seal a cross section of the tube by heat sealing the plastic covering material.

In the case of packages with no layer of aluminium or other electrically conductive materials, the cross sections of the tube are normally sealed using a hot plate for locally heating the packaging material inwards.

More specifically, one of the jaws is equipped with a hot plate, while the other normally has one or more pressure pads of flexible material. This method, commonly referred to as "hot-plate" sealing, calls for relatively prolonged contact between the hot plate and the packaging material.

To accelerate local melting of the packaging material, and so increase package production speed, increasing use is made of ultrasonic sealing devices, which substantially comprise a mechanical-vibration generator or sonotrode and an anvil—known for example from EP-B-615907 in the name of the same Applicant—fitted to respective jaws in each pair and which cooperate with each other to heat the packaging material by means of ultrasonic vibrations.

More precisely, the sonotrode disclosed in EP-B-615907 substantially comprises a head and a unique drive unit which consists of a stack of alternate piezoelectric ceramic plates and conductive metal sheets.

The head defines a sealing surface which extends along a first direction, and the drive unit is fitted to the head on the opposite side of the sealing surface.

The drive unit is coupled to an alternate current generator. In this way, the piezoelectric ceramic plates convert the electrical supplied voltage into a mechanical strain which causes the oscillation of the head and, therefore, the sealing of the transversal sealing band.

In particular, the sonotrode constitutes a half-wave resonator, i.e. the entire length of the sonotrode along a second direction orthogonal to the first direction consists of half a wave length of the oscillation of the head.

Ultrasonic sealing devices of the type described in EP-B-615907 have the following drawback.

When a longer transversal sealing band is desired, a plurality of the above-described sonotrodes must be interconnected for an additional length.

As a consequence, when the package of the volume of about 200 ml must be transversally sealed, two sonotrodes must be interconnected to each other.

Furthermore, the inevitable errors during the interconnection of the sonotrodes are likely to generate a non-uniform vibration between such sonotrodes. Accordingly, the resulting transversal sealing band may be uneven.

To overcome this drawback, WO-A-2007/020208, in the name of the same Applicant, discloses a single-piece sonotrode which accommodates three driven units fed by a single generator. In greater detail, the three drive units are fixed into respective recesses of the sonotrode, and have respective plurality of piezo-elements.

However, the sonotrode disclosed in WO-A-2007/020208 is not optimized for transversally sealing packages of about 200 ml, because the sealing surface resulting by the presence of three drive units is larger than required. For the same reason, the sonotrode disclosed in WO-A-2007/020208 cannot replace two adjacent sonotrodes of the type shown in EP-B-615907 in an existing packaging machine. As a matter of fact, the sealing surface of the sonotrode disclosed in WO-A-2007/020208 is larger than the sum of the length of two sealing surfaces of respective adjacent sonotrodes of the type shown in EP-B-615907.

Finally, the sonotrode disclosed in WO-A-2007/020208 comprises a pair of slots which are arranged between respective couples of drive units adjacent to one another.

The sonotrode also comprises a plurality, in particular three pairs, of S-shaped hooks for fixing the sonotrode to the frame of the jaw. The S-shaped hooks of each pair are arranged on opposite lateral side surfaces of the sonotrode and may be welded or unitarily formed to the sonotrode. Accordingly, the sonotrode is prevented from oscillating at the S-shaped hooks. In other words, the S-shaped hooks define respective nodal points of the sonotrode and lie on a "so-called" nodal plane of such sonotrode.

More precisely, slots extend orthogonal to a sealing surface of the sonotrode and between two subsequent pairs of S-shaped hooks. In particular, slots extend both above and below the S-shaped hooks. Accordingly, slots pass through the nodal plane of the sonotrode.

The Applicant has found that the vibration of the sonotrode disclosed WO-A-2007/020208 is made unstable by some additional parasitic frequencies.

Accordingly, the resulting transversal sealing band may still be not completely uniform and continuous. Furthermore, these additional parasitic frequencies result in additional fatigue stresses onto the sonotrode, with a consequent reduction of its fatigue residual life.

In order to reduce as far as possible the above-mentioned additional parasitic frequencies, WO-A-2011/117119, in the name of the same Applicant, discloses a sonotrode in which the head continues to accommodate three drive units, but the slots do not cross the nodal plane.

In other words, the sonotrode comprises a pair of first slots arranged on a first side of the nodal plane and a pair of second slots arranged on a second side of the nodal plane.

Furthermore, both the first slots and the second slots extend substantially parallel to a symmetry plane of the sonotrode and, therefore, orthogonally to the sealing surface of the sonotrode.

For the same reasons of the one disclosed in WO-A-2007/020208, the sonotrode disclosed in WO-A-2011/117119 is not optimized for transversally sealing packages having a volume of about 200 ml and cannot be retro-fitted in the existing packaging machines.

A need is therefore felt to render the above-identified sonotrodes optimized for transversally sealing packages of about 200 ml and suitable for being retro-fitted in existing packaging machines in place of two pairs of adjacent sonotrodes shown in EP-B-615907.

Furthermore, though highly reliable and efficient, the sonotrode disclosed in WO-A-2011/117119 leaves room for further improvement.

In particular, a need is felt within the industry to render the amplitude distribution of the vibration of the above-identified as even as possible, in order to increase the quality of the transversal sealing along the length of the same transversal sealing.

For the same reasons, a need is felt within the industry to render the above-identified amplitude distribution as stable as possible, when a non-uniform load is applied along the sealing surface.

For the same reasons, a need is also felt within the industry to increase the distances between the parasitic frequencies in comparison with the known solutions.

DISCLOSURE OF INVENTION

It is an object of the present invention to provide a sonotrode, designed to meet at least one of the aforementioned needs.

According to the present invention, there is provided a sonotrode, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Number 1 in FIGS. 1 to 4 indicates as a whole a sonotrode in accordance with the present invention.

Figure 6:
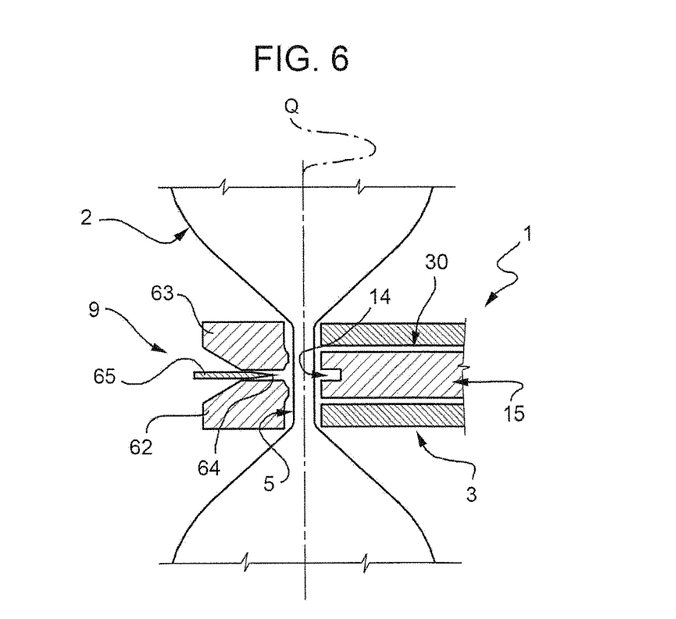
FIG. 6 is a schematic view of the sonotrode of FIGS. 1 to 5 during a sealing phase of a tube of packaging material.

Sonotrode 1 may be incorporated in a packaging machine (not shown) for producing sealed packages of a pourable food product, such as pasteurized or UHT milk, fruit juice, wine, etc., from a tube 2 of packaging material fed by known devices (not shown) along a vertical path Q (FIG. 6).

Tube 2 is formed in known manner by longitudinally folding and sealing a web of heat-seal sheet material, and is filled continuously from the top with the sterilized or sterile-processed food product.

The packaging machine comprises, in known manner, at least one pair of forming assemblies 3 (only one shown in FIG. 6) which interact cyclically and successively with tube 2 of packaging material to grip, ultrasonically seal, and cut tube 2 along equally spaced cross sections. More specifically, forming assemblies 3 interact with tube 2 to obtain a package connected to tube 2 by a transversal sealing bands 5, along which tube 2 is then cut.

Figure 7:
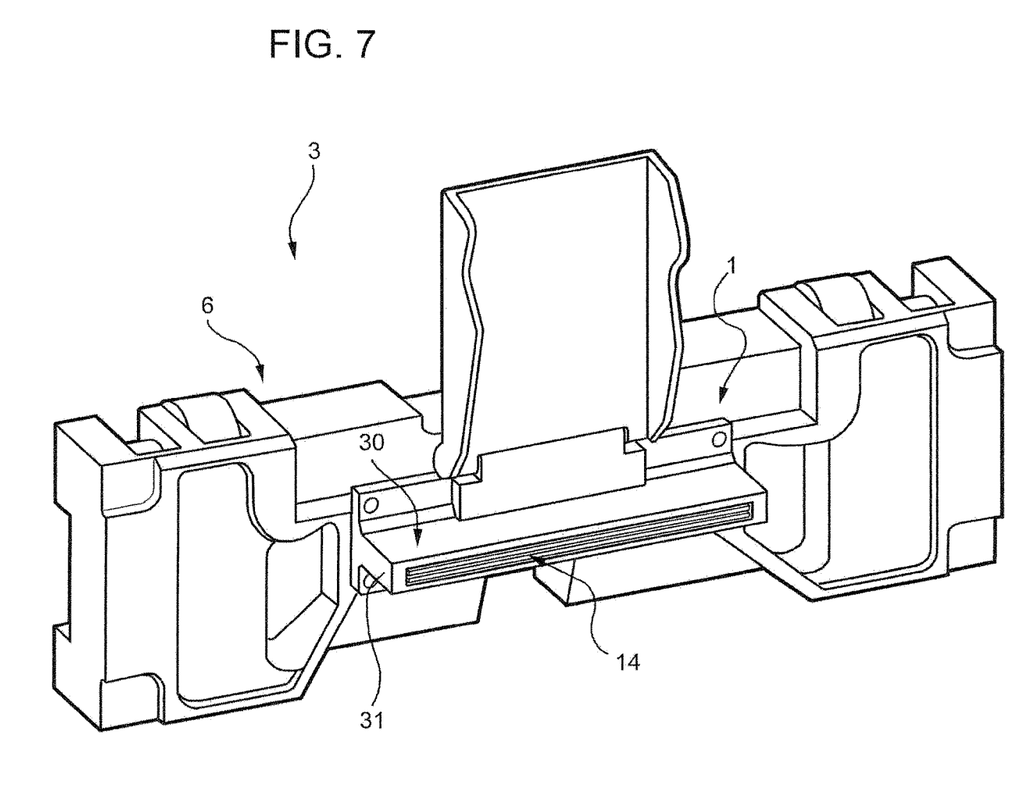
FIG. 7 shows a jaw and the sonotrode of FIGS. 1 to 6 which is attached to the jaw.

Each forming assembly 3—described herein only as required for a clear understanding of the present invention—substantially comprises a jaw 6 (FIG. 7) and a counter-jaw, which are located on opposite sides of tube 2, supports a mechanical-vibration generator or sonotrode 1 and an anvil 9 respectively, and are movable, in a direction crosswise to path Q, between an open configuration and a closed configuration in which they grip and seal tube 2 at a relative cross section to form a relative sealing band 5.

In a first alternative of packaging machine, forming assemblies 3 move along respective guides and interact cyclically with tube 2 to heat seal the packaging material of tube 2. Each forming assembly 3 comprises a slide movable back and forth along respective guide; and a jaw 6 and a counter-jaw which are hinged at the bottom to the respective slide, and move between a closed position, in which they cooperate with tube 2 to seal it, and an open position in which they are detached from tube 2.

In a second alternative, the packaging machine comprises two chain conveyors defining respective endless path and fitted with respective number of jaws 6 and corresponding counter-jaws. The two paths have respective branches substantially facing and parallel to each other, and between which tube 2 of packaging material is fed so that jaws 6 on one conveyor cooperate with corresponding counter-jaws on the other conveyor along said branches of respective paths, to grip the tube at a number of successive cross sections, and to seal and cut the packs.

Sonotrode 1 substantially comprises (FIGS. 2 to 4):
a single-piece head 15 which defines a sealing surface 14 extending along direction A; and
a unique drive unit 12 connected to head 15 and comprising a plurality of stacked piezo-electric elements 13.

Furthermore, the packaging machine comprises:
a unique alternate current generator (not shown) which is electrically connected with drive unit 12; and
a casing 30 (FIGS. 1 and 7) which houses head 15.

In greater detail, head 15 is delimited by a pair of walls 16, 17 opposite to one another, and a pair of walls 18, 19 opposite to one another and interposed between walls 16, 17.

Wall 16 defines sealing surface 14.

Height H of head 15 measured along a direction B orthogonal to sealing surface 14 is equal to the half of the wavelength of the wave oscillating along direction B.

Head 15 comprises a continuous edge 20 shaped as a closed line and which defines a nodal line of the oscillation of head 15.

In other words, the points of edge 20 substantially do not oscillate when piezo-electric elements 13 of drive unit 12 cause the oscillation of the remaining part of head 15.

Furthermore, the points of edge 20 define a so-called nodal surface, in particular a so-called nodal plane P which is orthogonal to direction B.

Edge 20 substantially comprises two segments 25 parallel to direction A and two segments 26 orthogonal to segments 25 and rounded, at their opposite ends, to segments 25.

Furthermore, plane P divides head 15 in a first and a second portion 21, 22.

Portion 21, 22 respectively comprise wall 16, 17.

The thickness of portion 21 is at first constant and then increases, proceeding from surface 14 towards edge 20.

Each portion 21, 22 further comprises a respective pair of slots 23, 27 which are elongated along direction B and pass through head 15 from wall 18 to wall 19.

Slots 23 extend completely within portion 21, slots 27 extend completely within portions 22, and slots 23, 27 extend at certain distance from plane P.

In other words, slots 23, 27 are detached and, therefore, do not cross plane P.

Put another way, slots 23, 27 are interrupted at a certain distance from plane P.

In particular, slots 23 extend for their entire length between edge 20 and sealing surface 14.

Figure 3:
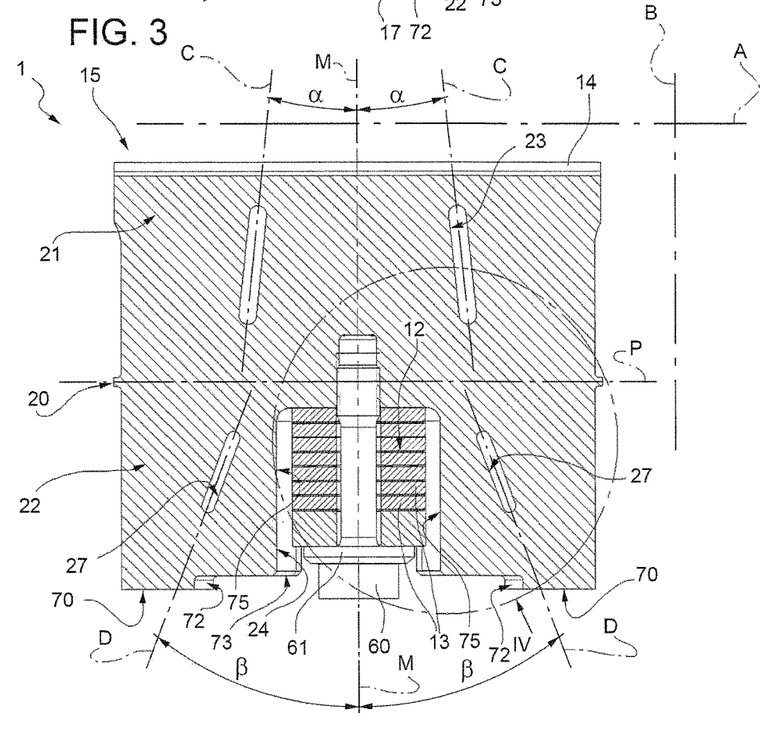
FIG. 3 is a section taken along line III-III of FIG. 2 in an enlarged scale.
Figure 4:
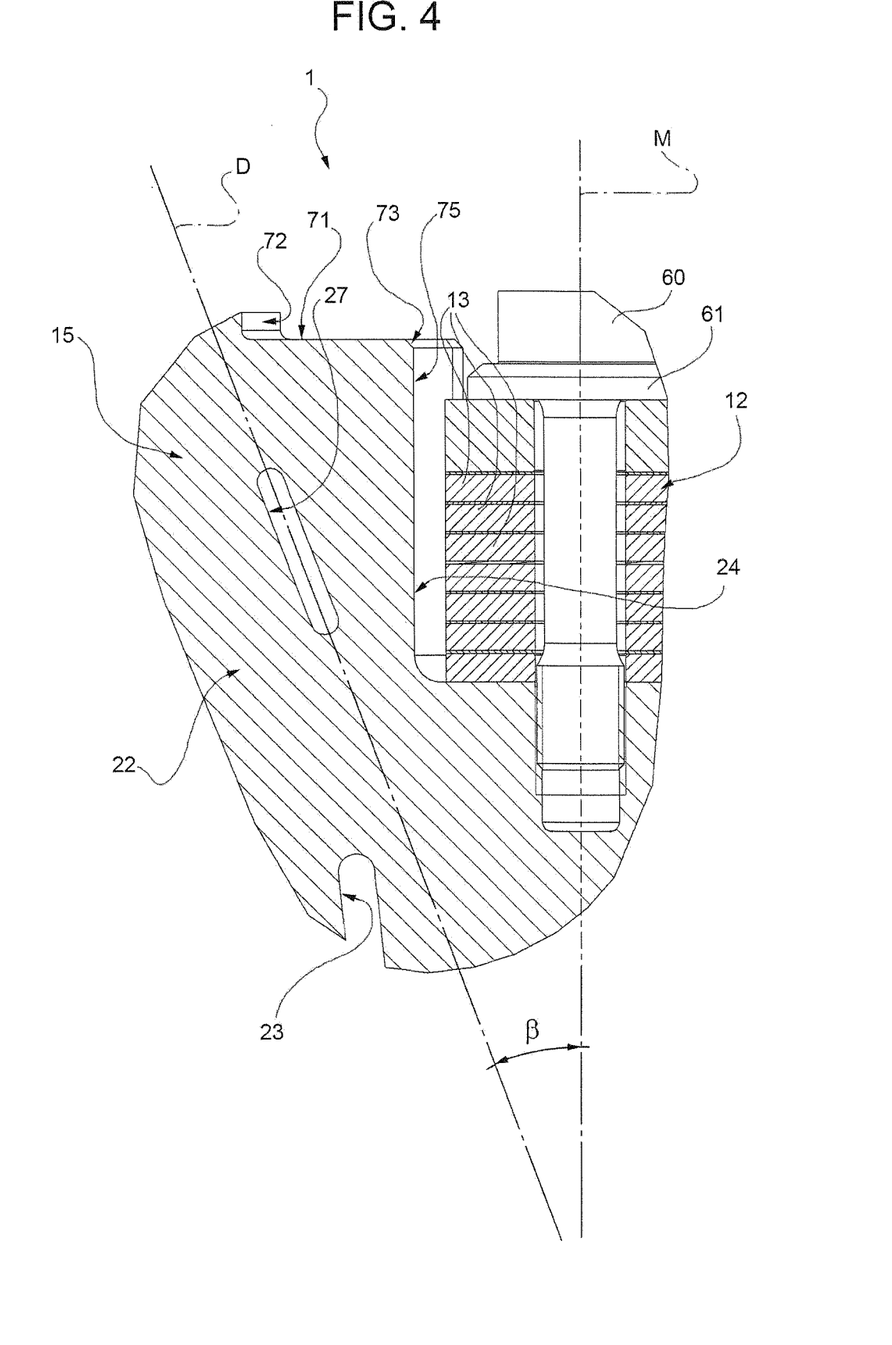
FIG. 4 shows some components of FIG. 3 in a magnified view.
Figure 5:
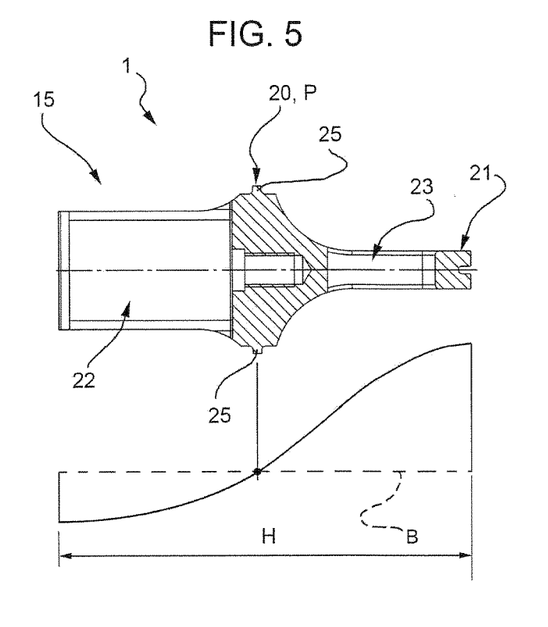
FIG. 5 is a section along line V-V of FIG. 2.

Sonotrode 1 also comprise a symmetric median plane M which is parallel to direction B (FIGS. 3 and 4).

Slot 23 advantageously extends parallel to respective directions C which are both inclined with respect to directions A, B and define, each, an angle α with plane M and, therefore, with direction B.

Angle α is acute.

Slots 23 extend symmetrically to plane M and, therefore, the angles α are equal to each other.

In particular, slots 23 converge towards each other, proceeding from plane P to surface 14 along direction B.

In the very same way, slots 27 extend parallel to respective directions D which are both inclined with respect to directions A, B and defines, each, an acute angle β with plane M and, therefore, with direction B.

Slots 27 extend symmetrically to plane M and, therefore, angles β are equal to each other.

In particular, slots 27 converge towards each other, proceeding towards plane P along direction B.

In the embodiment shown, angles α are smaller than angles β (FIG. 3).

Each angle α ranges between 5.4 and 6.6 degrees.

In the embodiment shown, angle α equals 6 degrees+/−0.5 degrees.

Each angle β ranges between and 18.9 and 23.1 degrees.

In the embodiment shown, angle β equals 21 degrees+/−0.5 degrees.

Slots 23, 27 pass through head 15 and are rounded at their opposite ends.

Each slot 23 has a length which ranges between 20.7 and 25.3 mm without the rounds at the ends.

In the embodiment shown, each slot 23 has a length of 23 mm+/−0.5 mm.

Each slot 27 has a length which ranges between 14.85 and 18.15 mm without the rounds at the ends.

In the embodiment shown, each slot 27 has a length of 16.5 mm+/−0.1 mm.

Portion 22 defines a seat 24 for drive unit 12.

Seat 24 is defined (FIGS. 2 to 4) by two cylindrical surfaces 75 which are arranged on opposite sides of plane M and between which drive unit 12 extends along direction B.

In particular, surfaces 75 are separated from drive unit 12 by an annular gap.

Figure 1:
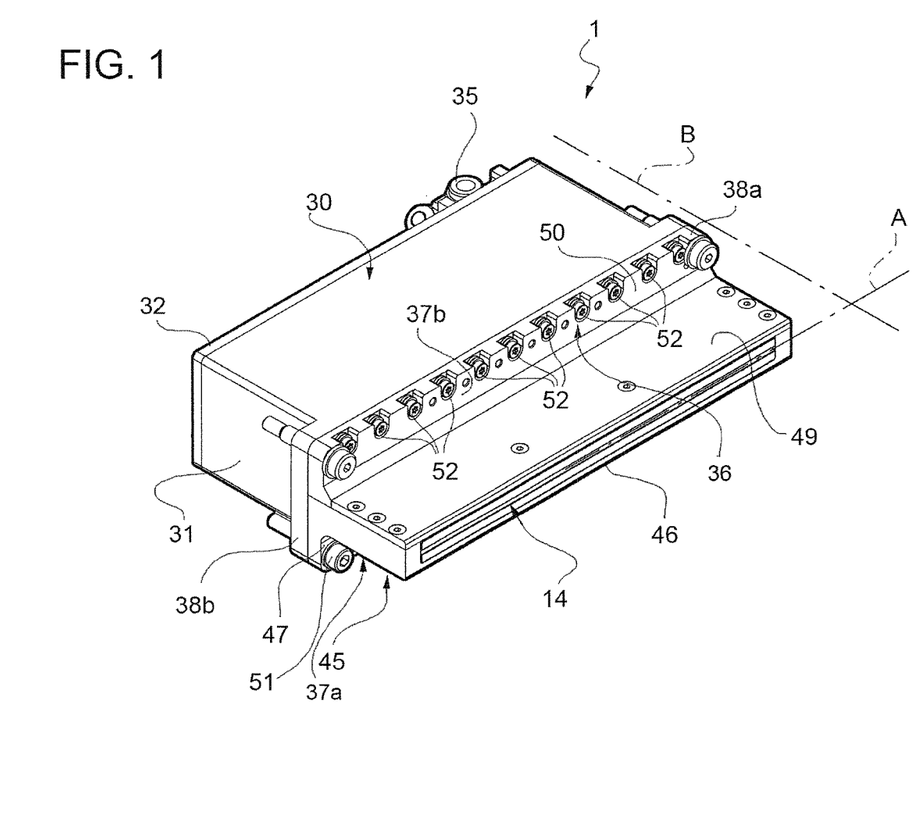
FIG. 1 is a perspective view of a sonotrode according to the present invention.
Figure 2:
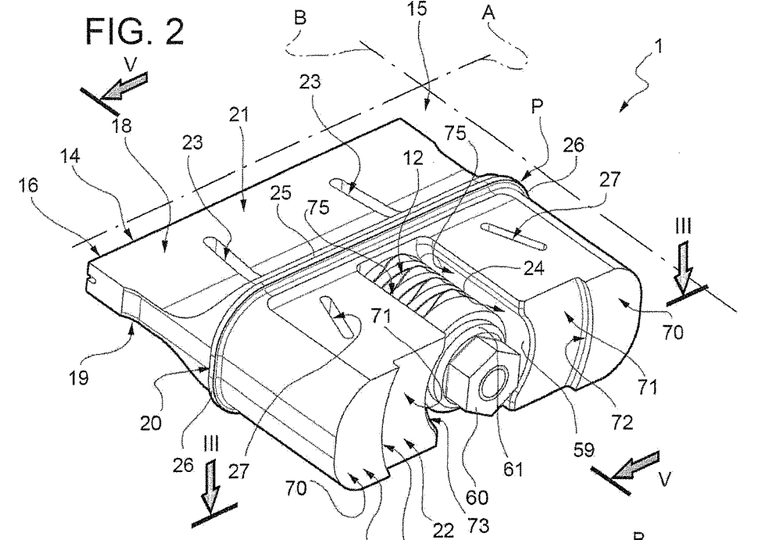
FIG. 2 is a perspective view of the sonotrode of FIG. 1 with parts removed for clarity and under a different visual angle.

Furthermore, wall 17 comprises a pair of relieved areas 71 (FIGS. 2 and 3).

In greater detail, wall 17 comprises:
a pair of areas 70 arranged on opposite sides of plane M;
relieved areas 71 arranged on opposite lateral sides of seat 24 and interposed, each, between seat 24 and relative area 70; and
a pair of shoulder 72 each dividing a relative area 70 from the corresponding area 71.

Areas 71 define respective substantially annular edges 73 of corresponding surfaces 75 which are on the opposite side of plane P.

Areas 71 are closer along direction B to plane P than areas 70.

Sonotrode 1 also comprises (FIG. 4):
a stud 60 fitted to head 15 and defining a hole engaged by drive unit 12; and
a nut 61 screwed to stud 60 and which firmly connects drive unit 12 to head 15.

In the embodiments shown, stud 60 is made by titanium.

Head 15 is connected to casing 30 along edge 20.

Casing 30 comprises (FIGS. 1 and 7):
- a box-shaped element 31 which houses portion 22 of head 15;
- a plate 32 cooperating with the side of element 31 which is opposite to sealing surface 14; and
- a connector 35 for connecting piezo-electric elements 13 to generator and cooperating with plate 32 on the opposite to head 15.

Element 31 comprises, on the opposite side to plate 32, an end edge 36.

Edge 36 is rectangular and comprises two long sides 37a, 37b parallel to direction A and two short sides 38a, 38b orthogonal to and interposed between sides 37a, 37b.

Casing 30 further comprises:
- an element 45 formed by a plate 46 and a crossbar elongated parallel to direction A and protruding downwards from plate 46;
- a plate 49 fitted to element 45 through a plurality of screws and extending parallel to plane M; and
- a crossbar 50 orthogonal to direction B.

Element 45, plate 49 and crossbar 50 define a hollow compartment which houses portion 21 of head 15.

Element 45 is connected to side 37a of end edge 36 through a plurality of screws 51 while crossbar 50 is connected to side 37b of end edge 36 through a plurality of screws 52.

In this way, screws 51, 52 connect element 45 and crossbar 50 to element 31 respectively along sides 37a, 37b of end edge 36.

Casing 30 is connected to jaw 6 through a plurality, four in the embodiment shown, of not-visible screws.

With reference to FIG. 6, anvil 9 is, in the embodiment shown, of the type described and illustrated in Patent EP-B-615907, and is substantially defined by two separate top and bottom portions 62, 63 defining in between a seat 64 for housing a knife 65. Very briefly, knife 65 is housed in sliding manner inside seat 64 of anvil 9, and is controlled by a known actuating device (not shown) to cut tube 2 at transversal sealing bands 5 and so detach from strip 4 the packages issuing from forming assembly 3 and to be folded into the finished shape.

The operation of sonotrode 1 is hereinafter described with reference to only a couple of jaw 6 and counter-jaw, and starting from a configuration in which jaw 6 and counter-jaw are in the closed configuration and grip tube 2 at a cross section.

In such configuration, sonotrode 1 cooperates with anvil 9 and the cross section of tube 2 is gripped therebetween.

At this stage, the generator feeds drive unit 12 with a given value of alternate current, so causing the ultrasonic vibration of piezo-electric elements 13 and, therefore, of sonotrode 1.

The ultrasonic vibration of sonotrode 1 causes the sealing of tube 2 and the formation of sealing band 5.

In particular, as sonotrode 1 vibrates, continuous closed edge 20 does not oscillate.

In fact:
- edge 20 is arranged against end edge 36 of element 31 of casing 30;
- element 31 of casing 30 is connected to element 45 and crossbar 50 along sides 37a, 37b of end edge 36; and end edge 36 of casing 30 is connected to jaw 6.

In other words, edge 20 forms a continuous closed nodal line of sonotrode 1.

Once drive unit 12 is deactivated, and before jaw 6 and counter-jaw are opened to commence the next forming cycle, knife 65 is activated and expelled from seat 64 in anvil 9 to cut the packaging material along the relative sealing band 5 and so detach from tube 2 a relative pillow pack which is subsequently folded into the finished shape.

The advantages of sonotrode 1 according to the present invention will be clear from the foregoing description.

In particular, slots 23, 27 extend along respective directions C, D which are inclined relative to symmetry plane M of sonotrode 1.

Figure 9:
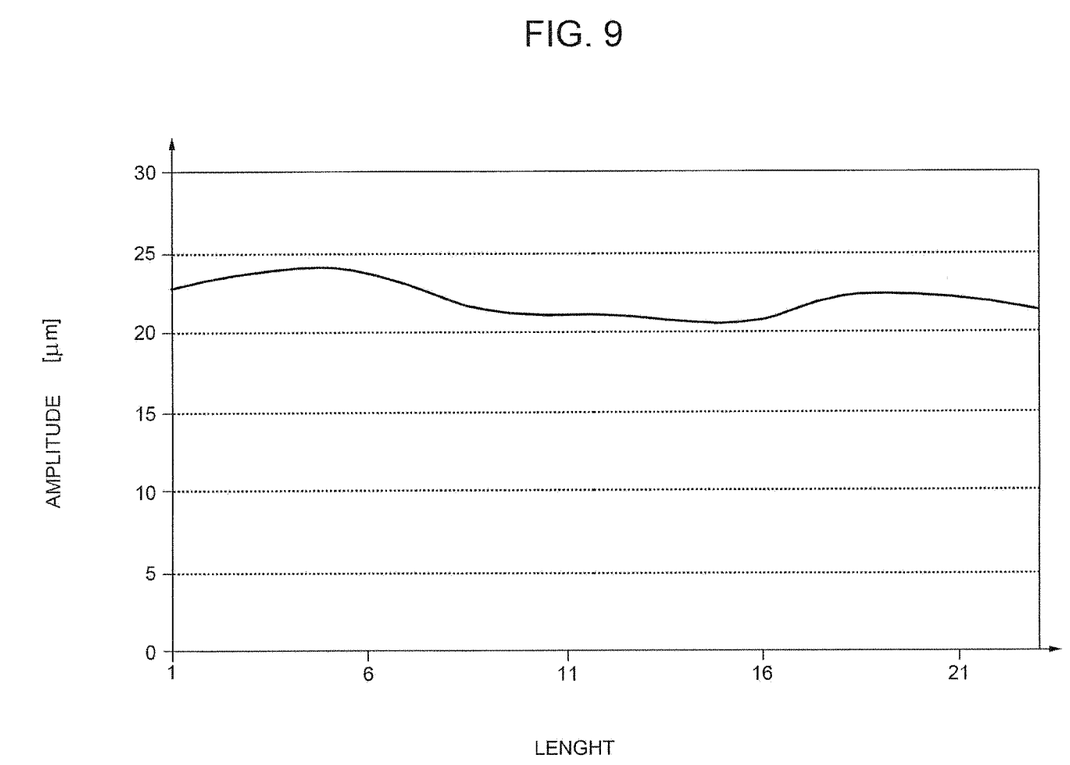
FIG. 9 shows a plot of the amplitude of the vibration of the sonotrode of FIG. 8 versus a position along the sonotrode.

In this respect, the Applicant has found that the above-identified design of slots 23, 27 renders particularly even the amplitude of the vibration of sonotrode 1 versus the position along surface 14 (see FIG. 9).

As a matter of fact, the plot of the amplitude vibration of sonotrode 1 versus the position along surface 14 (see FIG. 9) is substantially constant.

In this way, all the point of packaging material contacting surface 14 reach the necessary temperature to be heat sealed by sonotrode 1.

Furthermore, the Applicant has found that the above-identified design of slots 23, 27 renders particularly stable the amplitude of the vibration of sonotrode 1, even when a non-uniform load is applied onto jaw 6 and the counter-jaw.

Figure 8:
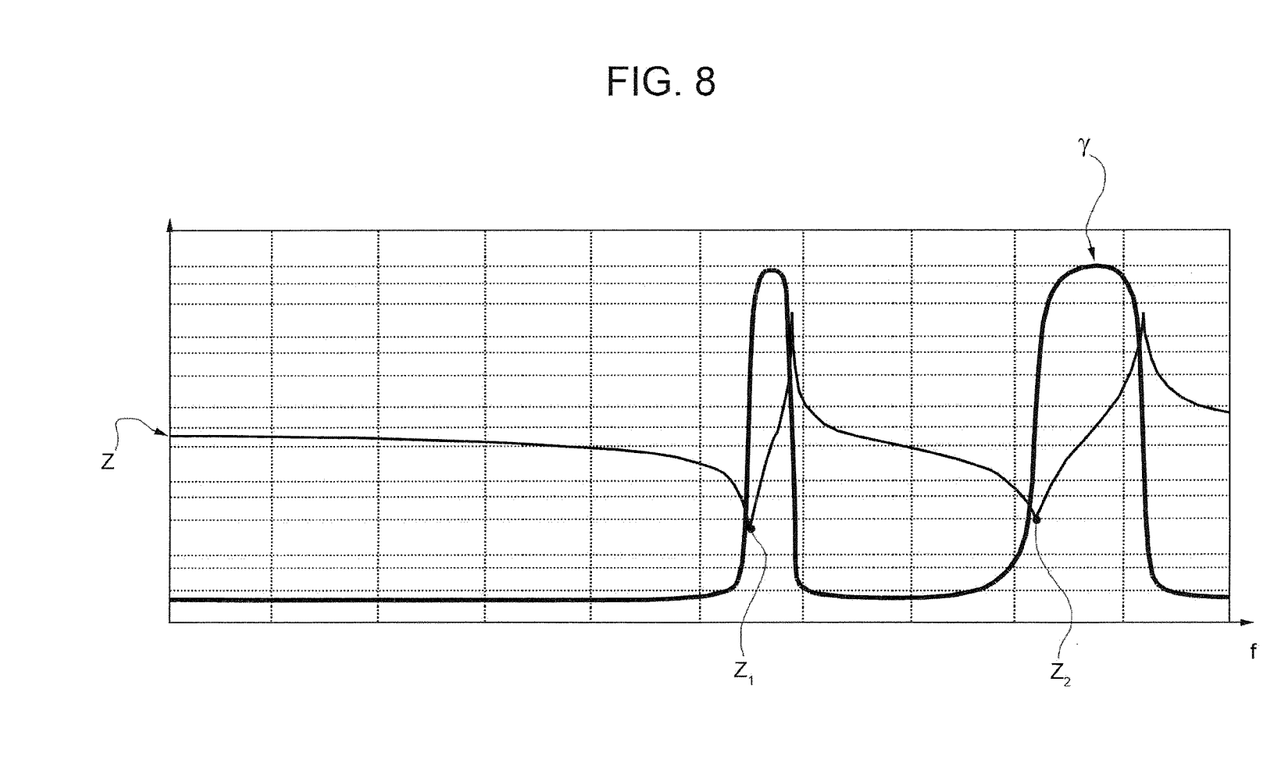
FIG. 8 shows a plot of the impedance and the phase of the sonotrode of FIGS. 1 to 6 versus the frequency of the generator.

Finally, the Applicant has found that the above-identified design of slots 23, 27 spaces the parasitic vibration frequency from the main vibration frequency of sonotrode 1 (see FIG. 8).

As a matter of fact, the impedance Z and the phase y plot of the vibration of sonotrode 1 have resonance minima Z1, Z2 spaced to each other versus frequency f.

In detail, impedance Z equals the complex ratio between the voltage applied to drive unit 12 and the resulting alternate current which pass through the piezo-stacks of the same drive unit 12.

Accordingly, the minima Z1, Z2 substantially correspond to the maxima of the above-identified alternate current and therefore to the maxima of the oscillation of sonotrode 1.

In particular, minimum Z1 corresponds to a desired work frequency whereas minimum Z2 corresponds to a parasitic frequency.

Due to the fact that minima Z1, Z2 are spaced to each other versus frequency f, the sealing time and the tightness of the sealing obtained by surface 14 of sonotrode 1 is enhanced.

Sonotrode 1 combines the above-identified advantages with the fact that it could be easily retro-fitted on existing packaging machine for realizing an efficient transversal sealing on packages of volume of about 200 ml.

As a matter of fact, thanks to the fact that it comprises a unique drive unit 12 and a unique sealing surface 14, sonotrode 1 overcomes the drawback deriving from the presence of two separate sealing surfaces like in the sonotrode disclosed in EP-615907.

Furthermore, the length of surface 14 can be with no problem made substantially equal to the length of the transversal sealing onto packages of volumes of about 200 ml. In this way, sonotrode 1 can easily replace a pair of sonotrodes of the type disclosed in EP-615907 on existing packaging machines, differently from the sonotrodes shown in WO-A-2007/020208 and WO-A-2011/117119 which have a too long sealing surface.

In addition, due to the fact that drive unit 12 is connected to head 15 by using stud 60 and nut 61, it is possible to provide drive unit 12 with more power than the power normally fed to the multiple drive unit of the known sonotrode discussed in the introductory part of the present description.

Finally, due to the fact that it comprises a unique drive unit 12, sonotrode 1 can transversally seal packages of volume of about 200 ml by using only one electrical generator.

Clearly, changes may be made to sonotrode 1 described herein without, however, departing from the scope of the present invention.

In particular, head 15 could comprise either only slots 23 or only slots 27.

In particular, head 15 could comprise, instead of edge 20, a plurality of attack elements which are connected to jaw 6.

In this case, the attack elements define respective nodal point of head 15 and lie on plane P while slots 23, 27 are detached from plane P.

The invention claimed is:

1. A sonotrode comprising:
   a head which defines a sealing surface elongated along a first direction orthogonal to a second direction; and
   at least one first slot which extends through said head transversally to said first direction;
   wherein said at least one first slot extends parallel to a third direction inclined to both said first direction and second direction;
   said first direction defining a first angle with said second direction;
   said sonotrode further comprising a pair of second slots which extend along respective fourth directions inclined with respect to both said first direction and said second direction; and
   said fourth directions being symmetric with respect to a symmetry plane of said sonotrode parallel to said second direction and defining, each, a second angle with said plane.

2. The sonotrode of claim 1, comprising a pair of first slots extending along respective third directions;
   said third directions being symmetric with respect to said symmetry plane of said sonotrode.

3. The sonotrode of claim 1, wherein said at least one first slot comprises a pair of first slots converging towards said sealing surface.

4. The sonotrode of claim 1, wherein said second slots converge towards said sealing surface.

5. The sonotrode of claim 1, comprising a nodal plane at which the amplitude of the oscillation of said head is substantially equal to zero, and which divides said head in a first portion and in a second portion;
   said sealing surface being defined by said first portion of said head;
   said at least one first slot extending completely within said first portion;
   said second slots extending completely within said second portion.

6. The sonotrode of claim 1, wherein said first angle and said second angle are acute, and in that said first angle is smaller than said second angle.

7. The sonotrode of claim 1, comprising a unique drive unit which may be electrically fed by a unique generator so as to cause the oscillation of said head.

8. The sonotrode of claim 7, comprising connecting means for connecting said drive unit to said head;
   said connecting means comprising, in turn:
   a nut connected to one of said drive unit and said head; and
   a stud connected to the other one of said drive unit and said head.

9. The sonotrode of claim 1, wherein the height of said head measured along said second direction transversal to said sealing surface is substantially equal to the half of the wavelength of the wave oscillating in the direction of said second direction.

10. The sonotrode of claim 1, wherein said head comprises:
    a seat for said drive unit; and
    an end wall opposite to said sealing surface and which defines a pair of relieved areas which surrounds said seat.

11. The sonotrode of claim 5, comprising a casing which accommodates said head and may be connected to a packaging machine; and in that said head comprises an edge which lies on said nodal plane;
    said head being connected to said casing along said edge.

12. The sonotrode of claim 1, wherein said first angle ranges between 5.4 and 6.6 degrees.

13. The sonotrode of claim 1, wherein said second angle ranges between 18.9 and 23.1 degrees.

14. A packaging machine for producing sealed packages of a pourable food product from a tube of packaging material fed along a vertical path, filled continuously with said food product, and gripped at equally spaced cross sections, said machine comprising:
    sealing means for sealing the packaging material of said tube along said cross sections;
    said sealing means comprising an anvil and a sonotrode;
    wherein said sonotrode is a sonotrode as claimed in claim 1.

15. A sonotrode comprising:
    a head which defines a sealing surface elongated along a first direction orthogonal to a second direction; and
    at least one first slot which extends through said head transversally to said first direction;
    wherein said at least one first slot extends parallel to a third direction inclined to both said first direction and second direction;
    said first direction defining a first angle with said second direction; and
    said at least one first slot comprising a pair of first slots converging towards said sealing surface.

16. A sonotrode comprising:
    a head which defines a sealing surface elongated along a first direction orthogonal to a second direction; and
    at least one first slot which extends through said head transversally to said first direction;
    wherein said at least one first slot extends parallel to a third direction inclined to both said first direction and second direction;
    said first direction defining a first angle with said second direction;
    said sonotrode further comprising a nodal plane at which the amplitude of the oscillation of said head is substantially equal to zero, and which divides said head in a first portion and in a second portion;
    said sealing surface being defined by said first portion of said head;
    said at least one first slot extending completely within said first portion.

* * * * *